United States Patent [19]

Hall

[11] 4,235,694
[45] Nov. 25, 1980

[54] ELECTROLYTIC CELLS FOR HYDROGEN GAS PRODUCTION

[76] Inventor: Frederick F. Hall, 2452 Villanueva, Mountain View, Calif. 94040

[21] Appl. No.: 949,075

[22] Filed: Oct. 6, 1978

Related U.S. Application Data

[63] Continuation of Ser. No. 767,122, Feb. 9, 1977, abandoned.

[51] Int. Cl.³ .............................................. C25B 9/00
[52] U.S. Cl. .................................. 204/266; 204/268; 204/270; 204/129
[58] Field of Search ............... 204/256, 258, 266, 268, 204/270, 290 R, 129, 295

[56] References Cited

U.S. PATENT DOCUMENTS

| | | | |
|---|---|---|---|
| 2,636,856 | 4/1953 | Suggs et al. | 204/290 R |
| 3,704,221 | 11/1972 | McCully | 204/295 |
| 3,855,104 | 12/1974 | Messner | 204/256 X |
| 3,976,549 | 8/1976 | Falvo | 204/295 X |
| 4,023,545 | 5/1977 | Mosher et al. | 204/129 X |

*Primary Examiner*—Charles F. LeFevour
*Attorney, Agent, or Firm*—Finnegan, Henderson, Farabow, Garrett & Dunner

[57] ABSTRACT

An electrolytic cell bank comprising two end plate electrodes, a plurality of intermediate electrodes, a plurality of dielectric separators spaced between the electrodes to form electrolytic cell chambers, a plurality of gas separator diaphragms, alkaline electrolyte, manifolds for allowing off-gas withdrawal of hydrogen and oxygen and means for back-pressuring the exterior walls of each end plate to counter-balance pressures developed within the electrolytic cell chambers. The cell bank is utilized to convert water into its constituent gases of oxygen and hydrogen, and the cell bank is sufficiently large to commercially produce hydrogen at pressures equal to the pressures utilized in commercial gas transmission lines.

13 Claims, 5 Drawing Figures

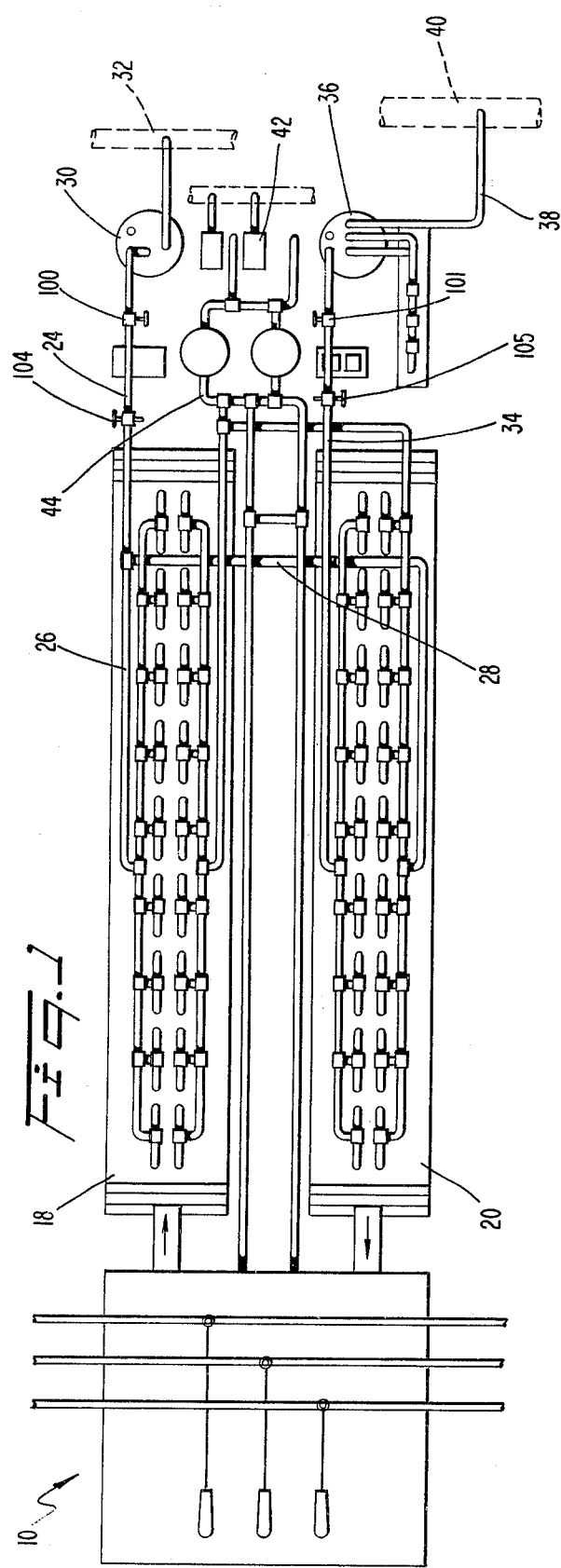
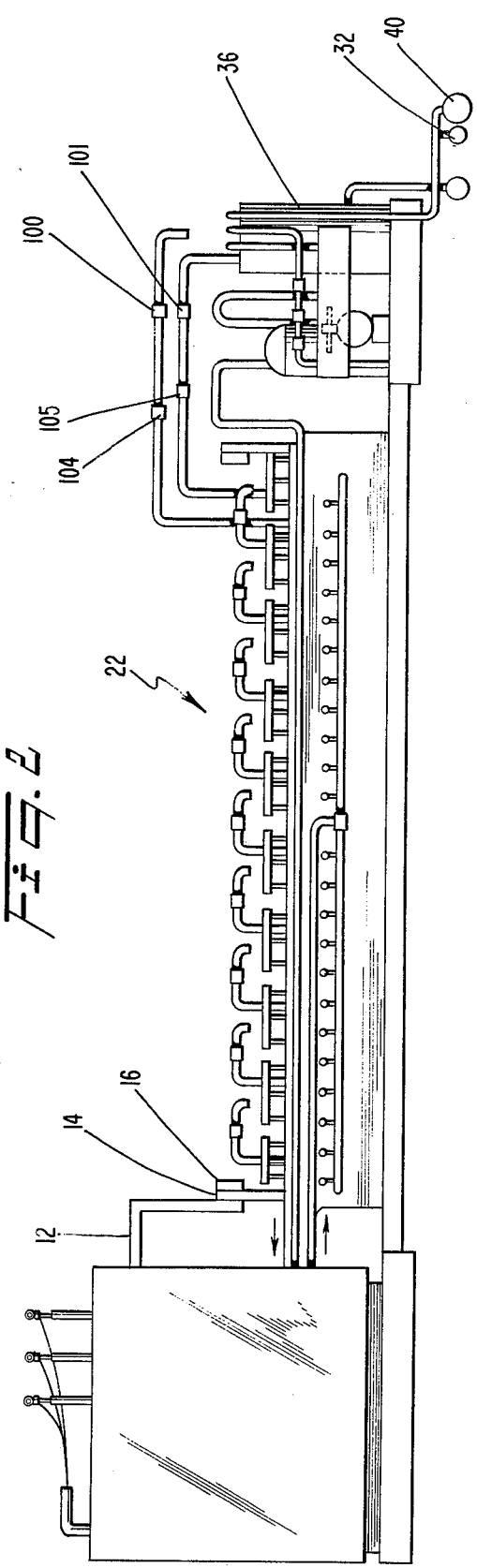

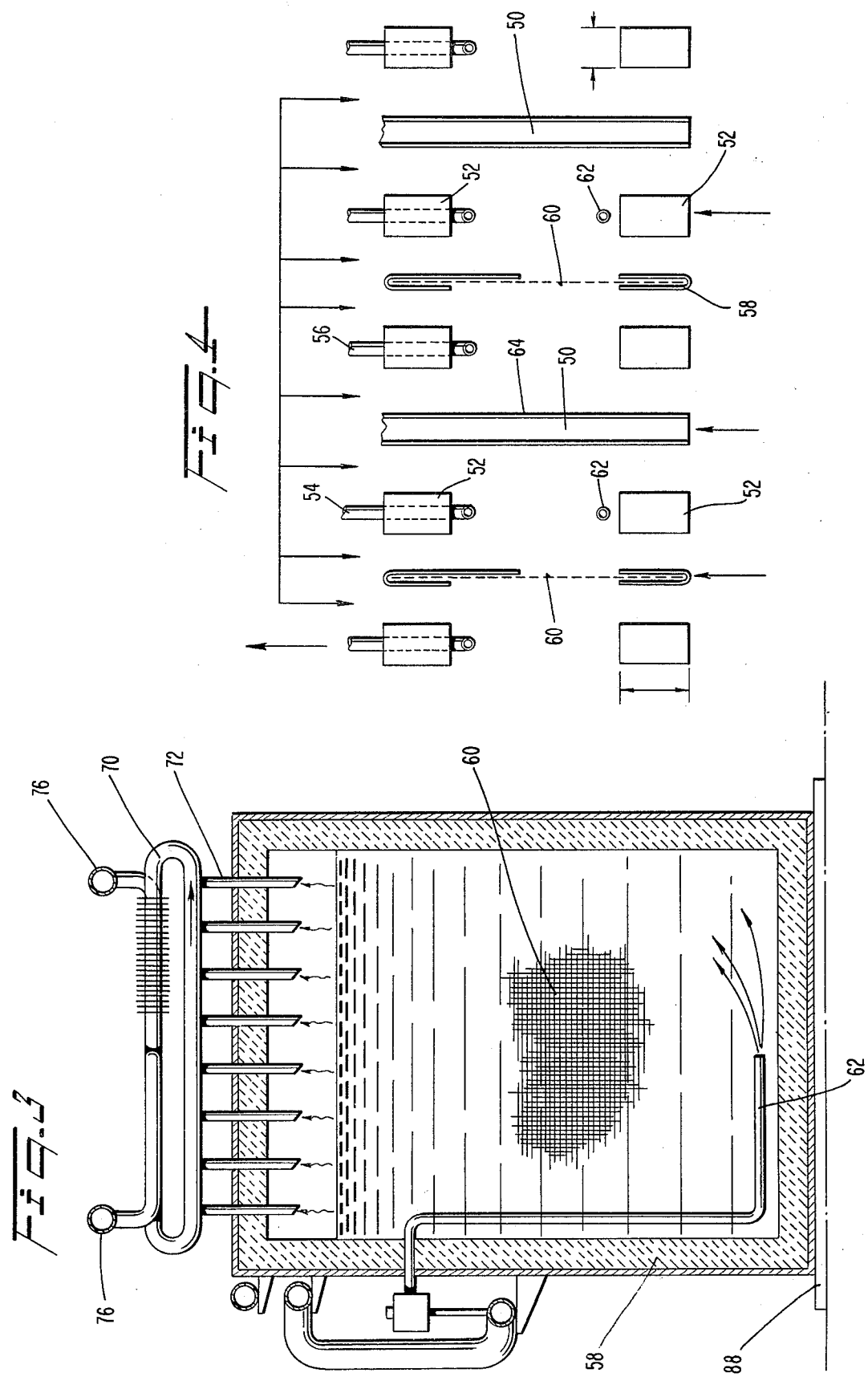

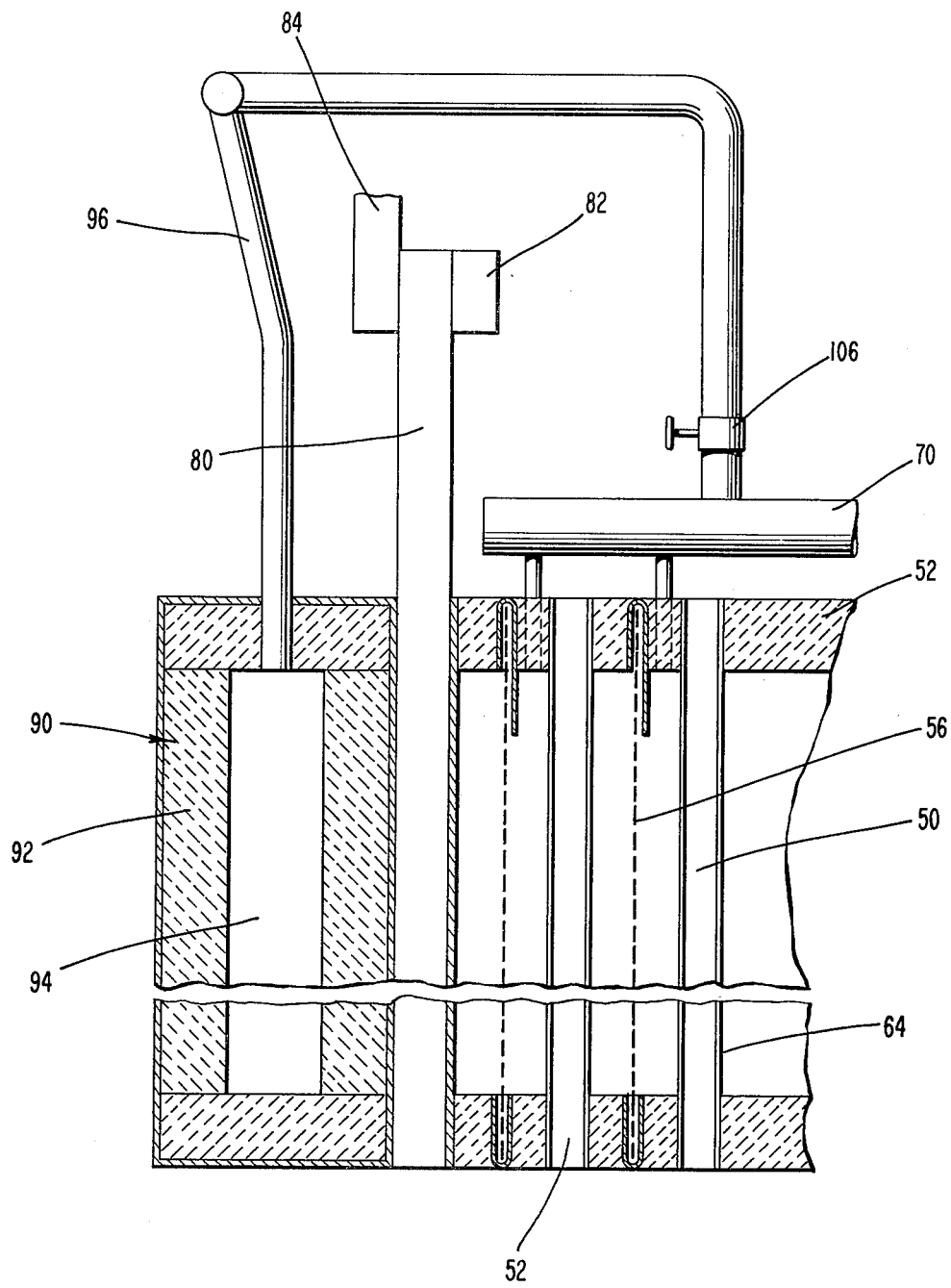

ELECTROLYTIC CELLS FOR HYDROGEN GAS PRODUCTION

This is a continuation of application Ser. No. 767,122, filed 2/9/77, now abandoned.

BACKGROUND OF THE INVENTION

The present invention relates to electrolytic cell banks for the production of hydrogen and particularly relates to a hydrogen production plant having an electrolytic cell bank for separating water into its constituent gases of hydrogen and oxygen.

Bipolar electrodes were patented in Germany in 1899 by an inventor named Schmidt for use in electrolytic cells intended for an entirely different purpose. He sought pure oxygen. Today we seek impure hydrogen to augment and replace our dwindling supplies of natural gas. Hydrogen in certain regards is an ideal fuel. It burns giving off heat, and its ashes are water vaper. Per pound, hydrogen contains three times as much heat value as does an average petrol-fuel. Also, per pound, hydrogen contains four times as much heat value as do the very best grades of coal. At low pressure and ambient temperature, hydrogen is very diffuse and is not attractive as a fuel. However, at higher pressures and lower temperatures, hydrogen is an attractive fuel, provided "free fuel" power plants are built to produce it. Two things are most required to enable economical production of hydrogen. The first is a truly inexpensive hydrogen production cell-bank requiring no maintenance. The second is an inexpensive method of collecting solar light, converting it to heat at very high temperatures and then using this heat to produce hydrogen gas which can be burned as a fuel at any later time in conventional thermal-electric plants. This invention is directed to the hydrogen production cell-bank.

SUMMARY OF THE INVENTION

The invention is a unique, modular bank of electrolytic cells. It can only be used to separate water into its constituent gases of hydrogen and oxygen. It can be powered using any commercially available AC/DC rectifier. It can be arranged to accept DC current at any standard operating voltage to 20,000 volts. It can accept DC currents at any desired current flux although, inherently, current flux must be low if hydrogen production efficiency is to be high. It can accept DC current at any standard operating voltage to 20,000 volts. It can accept DC current at any desired current flux although, inherently, current flux must be low if hydrogen production efficiency is to be high. It can accept DC current flow in either direction provided off-gas manifolds are correctly connected to extraneous gas piping systems. It can be operated at any temperature to the structural limitations of its plastic dielectric separators which would be close to 810° R. if Teflon is used. It can be arranged to be operated at any in-cell pressure that is slightly above gas-transmission piping working pressure so as to obviate need for off-gas compressors. It can be operated in conjunction with a neon refrigerator so that hydrogen off-gas can be chilled to reduce its specific volume as desired down to a minimum temperature of close to 60° R. Its hydrogen off-gas can also be contaminated to have a distinct odor, have a visible flame when burned and to prevent hydrogen embrittlement of steel gas transmission piping. Its makeup water must be pure to prevent silting of cells and have high specific resistance to permit its use for cooling DC power supply components. It must be arranged so that each cell has individual traps in its hydrogen and oxygen off-gas lines to prevent loss of electrolyte or liquid water. Its electrolyte must be an alkaline solution such as 15% NaOH or 25% KOH to have minimal electrical resistance and prevent incell corrosion. Its electrodes are thin carbon steel plates clad on each side with a veneer of austenitic stainless steel. Its electrodes are bipolar, are thin in the direction of DC current flow to minimize electrode resistance losses and are built into cell-bank tank walls to act as diaphragms to structurally contain high in-cell operating pressures. Its end walls are thick steel plates clad on each side with a veneer of austenitic stainless steel and are back-pressured from the oxygen off-gas manifold using the same structural detail as for cell-bank tank walls without requiring massive steel pressure vessels. Thick end plates equalize in-cell current flux and are extended to connect to DC power bus bars. Its nominal description is "ELECTROLYTIC CELLS FOR PRODUCING HYDROGEN GAS WITH LOW COST ELECTRODES BUILT INTO PRESSURE TANKS". There is nothing like it on the market and anticipated costs per KWe consumed (or per pound of hydrogen gas disassociated) are considerably lower than for competitive designs.

A hydrogen production plant to be a competitive source of fuel gas sould consist of the following subsystems:

1. A source of AC power having its production based on "free fuels" such as solar energy, wind power or water power.

2. Solid state, low cost, reliable, high voltage, AC/DC rectifier as are available commerically.

3. Large, high capacity, modular, efficient, low cost, electrolytic cell banks which can be operated at temperatures to 810° R. and pressures above those used in existing natural gas transmission pipelines. Such cell banks are not available commercially.

4. A small makeup water purification and demineralization plant is necessary to provide high specific resistace water for first cooling AC/DC rectifier components and then as source of clean makeup water to prevent silting of electrolytic cells.

5. An oxygen cryostat to permit liquefaction of off-gassed oxygen from electrolytic cell-banks when this can be done profitably. Where this cannot be done profitably off-gassed oxygen would be vented through a gas-turbine used to drive a neon compressor.

6. A neon refrigerator would be used to chill and shrink the specific volume of of-gassed hydrogen from electrolytic cell banks in order that fuel value throughput existing gas transmission pipelines could be maintained or increased.

7. A total off-gassed hydrogen flow sensitive hydrogen gas contaminator would be used to insure that produced hydrogen gas would have a distinct odor, burn with a visible flame and not subject existing steel natural gas transmission lines to hydrogen embrittlement.

This invention has to do with item (3) the electrolytic cell banks that are needed for future high capacity hydrogen gas production plants.

Accordingly, it is an object of the present invention to provide an improved electrolytic cell bank for the production of hydrogen.

To achieve this and other objects in accordance with the purpose of the present invention, as embodied and broadly described herein, the bank of electrolytic cells of this invention for electrolytically converting water into its constituent gases of hydrogen and oxygen comprises two end plate electrodes, a plurality of intermediate electrodes spaced between the end plate electrodes, a plurality of dielectric separators spacing and electrically separating adjacent electrodes from one another and, together with the electrodes, forming impervious electrolytic cell chambers between adjacent electrodes, a plurality of gas separator diaphragms individually spaced between adjacent electrodes to divide each electrolytic cell chamber into two sections to prevent the remixing of hydrogen and oxygen, alkaline electrolyte contained in each cell, means for introducing water to each of the electrolytic cell chambers, first manifold means connected with like sections of each of said electrolytic cell chambers for allowing off-gas withdrawal of hydrogen, first automatic valve means for closing said first manifold means whenever pressure within the electrolytic cell chambers. is equal to or less than a preselected pressure, second manifold means connected with the other like sections of each electrolytic cell chamber for allowing off-gas withdrawal of oxygen, second automatic valve means for closing said second manifold means whenever pressure within the electrolytic cell chambers is equal to or less than the preselected pressure and means for back-pressuring the exterior walls of each end plate electrode to counter-balance any pressure developed within the adjacent electrolytic cell chambers and exerted against the inside wall of the end plate electrodes.

The accompanying drawings, which are incorporated in and constitute a part of the Specification, illustrate one embodiment of the invention and, together with the description, serve to explain the principles of the invention.

BRIEF DESCRIPTION OF THE DRAWINGS

FIG. 1 is a plan view of a hydrogen production plant utilizing the electrolytic cell bank of the present invention;

FIG. 2 is a side elevation view of the plant of FIG. 1;

FIG. 3 is an enlarged cross-sectional view through one of the cells of the electrolytic cell bank illustrated in FIG. 1; FIG. 4 is a schematic side elevational view of the elements comprising the cell banks in exploded juxtaposition relative to one another; and FIG. 5 is an enlarged fragmentary cross-sectional view, taken perpendicular to the view shown in FIG. 4 and with parts broken out for ease of illustration, of the construction of the end of the cell bank.

DESCRIPTION OF THE PREFERRED EMBODIMENT

Reference will now be made in detail to the present preferred embodiment of the invention, an example of which is illustrated in the accompanying drawings.

The hydrogen production plant utilizing the cell banks of this invention is illustrated in FIGS. 1 and 2 and comprises a power source generally designated 10, preferably and AC/DC rectifier, having suitable connections to a pair of cell banks 18 and 20 through a rectifier bus 12, an end plate 14, and a DC current equalizing bar 16. Suitable off-gas piping, generally designated 22, is connected to each of the cells to carry off generated oxygen and hydrogen. Particularly, the oxygen off-gas flows through a conduit 24 in communication via branches 26 and 28 with each of the cell banks for supply to a LOX cryostat 30. A LOX pipe 32 places LOX cryostat 30 in communication with a storage tank, not shown. The hydrogen off-gas flows through a conduit 34 having similar branches in communication with each of the cell banks of banks 18 and 20 for flow through a refrigerator unit 36 into a conduit 38 for delivery to a hydrogen gas transmission line designated 40. Suitable connections are provided for transmitting makeup water to each of the cells by way of water pumps and demineralizers 42.

Referring now to FIG. 4, each cell is comprised of electrodes 50, rectangular dielectric separator frames 52, a gas separator diaphragm 60, discrete off-gas pipes 54 and 56 arranged at the top of the cell, and makeup water inlets 62. The dielectric spearator frames 52 are disposed on opposite sides of a gas separator having a diaphragm fram 58 with a central opening containing the gas separator diaphragm 60. Preferably, the electrodes 50 of each cell are fused to the corresponding dielectric separator frames 52 by a hot melt process whereby the dielectric separator frame 52 is in turn fused to the frame 58 of the gas separator. This fused construction provides a closed cell except for the off-gas outlets and makeup water inlets. Electrolyte, of course, is disposed in each cell between the opposed electrodes and communicates through the gas separator diaphragm 60.

The electrolytic cell banks described hereinafter consist of the following components:

(1) Electrodes
(2) Dielectric Separators
(3) In-cell Gas Separation Diaphragms
(4) Electrolyte
(5) Makeup Water Fill Valves
(6) Cell Off-gas Piping & Filters
(7) Cell-bank Off-gas Manifolds
(8) Cathodic/Anodic End plates
(9) Dielectric Skin
(10) Instrumentation & Control The above listed electrolytic cell-bank components are described hereinbelow:

Electrode 50 are preferably bipolar to obviate the need for expensive top-mounted DC current cell-to-cell jumpers and are also thin to eliminate electrode $I^2R$ losses as a major design consideration. Electrodes 50 are preferably laminated to allow low cost carbon steel plate to be used as cores. The electrodes surfaces in contact with the electrolyte are clad with very thin sheets of austenitic stainless steel 64 to obviate electrode corrosion and provide a surface for the evolution and breakaway of gas bubbles. Very thin 304 L stainless steel electrical surface cladding would be satisfactory. Electrodes 50 are built into cell-bank walls and act as pressure-resisting diaphragms to allow in-cell pressures to 1000 PSIA of higher so as to be above the operating pressure of existing fuel gas transmission piping systems. DC current can flow through electrodes 50 in either direction depending on the polarity of cell-bank end plates.

Dielectric separators 52 are formed using rectangular stock of thermoplastic material. The narrow dimension is sufficiently large to allow evolving bubbles to clear surface of the electrolyte and leave through off-gas tubing 54, 56 at the top of cell. In effect the narrow dimension is equal to one-half of cell pitch. In the embodiment shown in FIG. 5, the electrodes 50 are preferably spaced one inch apart and the dielectric separators are 0.5" across. The dielectric separators 52 are wide enough to allow adherence to stainless steel surfaces and act as a beam to resist in-cell operating pressures. Preferably, dielectric separators 52 are formed of FEP Teflon (fluorinated ethylene-propylene) and are adhered to the stainless steel surfaces of the electrodes 50 by the hot melt process at close to 1200° R. while under a compression pressure of at least 50 PSIG. Other suitable material or assembly procedure could be utilized. FEP Teflon also is one of the few plastics which can be used continously at temperatures of 800° R. or slightly higher without loss of strength.

Each cell is divided into two sections by the gas separation diaphragm 60 to prevent remixing of hydrogen and oxygen bubbles. Diaphragms of woven asbestos fiber have almost universally been used despite strong evidence of steady deterioration in service. It is not possible to design electrolytic cells that are low in cost if any of the internals must be inspected and maintained or replaced from time to time. In the preferred embodiment gas separation diaphragms are preferably made up using two layers of fabric 60 having a fine weave using glass fiber yarns. Glass cloth does not deteriorate when immersed for long periods in strong alkaline electrolyte solutions nor will its weave inhibit rapid passage of ions toward oppositely charged electrode surfaces. Glass cloth 60 is preferably crimped into frames 58 made up of FEP Teflon sheeting to prevent the glass yarns from reaching cell-bank tank wall surfaces and acting as weep paths which could results in loss of electrolyte. Use of FEP Teflon insures proper self-welding into tank walls during the hot melt process needed to adhere the FEP Teflon dielectric separator stock 52 to the stainless steel surfaces 64 of electrodes 50. Frames 58 minimize distortion and insure proper areas for rising gas bubbles. FEP Teflon sheeting is also used in the gas phase portion of the cells above the electrolyte surface to create a solid gas separation barrier.

If sea water could be used functionally as the electrolyte its cost would be very low. However a salt water solution with the same strength as sea water will very quickly attack stainless steel and visibly contaminate the electrolyte. Acid solutions hold no advantages and would increase corrosion problems. Accordingly, an alkaline electrolyte is used in the present invention. Either a 15% solution of NaOH or a 25% solution of KOH could be used. KOH costs close to 50% more than NaOH but has less electrical resistance than NaOH at all operating temperatures of interest. The recommended alkaline electrolyte therefore is KOH despite the 250% increase in cost. Since the initial charge of electrolyte will be used throughout the life of an electrolytic cell bank, the initial extra electrolyte cost is no substantial economic problem.

Each cell also receives makeup water to replace water that is disassociated. The system used to supply makeup water must be dielectric in nature in order to maintain effective cell-bank operation. Plastic piping 44 (FIG. 1) can be used and the water is easily demineralized to a specific resistance of two ohms. Makeup water pressure must exceed in-cell pressure and this is provided by canning inexpensive low differential pressure-type fill valves within high pressure rated valve bodies. The problem can be compounded if cell-banks are operated at widely fluctuating load levels since electrolyte density will be least when operation is at high. temperature and higher than normal rates of hydrogen production. Preferably therefore individual fill valves are provided for each cell. It is not precluded that other methods including occasional ganged refilling might be adequate. If individual valves were to be used the inner workings would be similar to the low cost Fillmaster units used to replinish toilet bowl flush tanks. The cost of any system used will be pretty much the same and cost will not be a major consideration. A glass rod peephole is also provided through the FEP Teflon tank sides before the hot melt process, as necessary to allow visual checking of in-cell conditions and fill valve adjustment.

It is important to keep the electrolyte solution the same from cell to cell and at the optimum strength of 15% for NaOH or 25% for KOH to maximize cell-bank performance. For reasons discussed later, cell width is preferably about nine feet. Each half of each cell is provided with a manifold 70 (FIG. 3) with a number of beveled tee connections 72. These manifolds in the preferred embodiment, are eight feet long to allow off-gas withdrawal equally across the cell width at one-foot centers. The flow area of eight beveled tees is sufficient to maintain velocity of hydrogen gas leaving a cell at 100 feet per minute or less to minimize carryover of liquid spatters. Manifold 70 are at staggered levels to permit the nominal diameter of the manifold to be preferably one-half of an inch. Manifolds would be filled with compressed glass wool to offer substantial surface area for plating out of liquids which can then drain back to the cell through any of the eight tee connections 72. The ends of manifolds 70 are U-bent to form a second manifold with a single tee connection aimed up near the centerline of cell. These second manifolds are finned, filled with compressed glass wool and cambered to allow any added liquid that passes through the first manifold trap to condense, plate out and drain outward and downward to one of the first level manifolds. The upward aimed tees of the second level manifold are extended to cell-bank off-gas manifolds 76. It is expected that the filtering capability of the cell off-gas piping as described above will approach that of 99.999998% effective microalescent type oil separators as are often used in air compressor discharge piping. All piping described above is preferably formed of stainless steel tubing. Beveled tees are welded to the manifolds. All manifold connections are preferably effected using highest grade compression fittings.

Every other half cell top level manifold has its upward aimed tee connected to one of two cell-bank off-gas manifolds 76. All remaining upward aimed tees are connected to a second cell-bank off-gas manifold. Cell-bank off-gas manifolds are preferably all-welded, seamless 304 L austenitic stainless steel and have pulled tees for connection to cell off-gas outlets. Connections between cell off-gas outlets and cell-bank off-gas manifolds preferably have a minimum of one right angle bend and cell-bank manifold pulled tees aim down. Each cell-bank off-gas manifold outlet has an automatic valve (100 and 101) actuated to close whenever in-cell pressure is equal to or less than extraneous gas main pressure. Cell-bank manifolds are located downstream of safety valves 104 and 105 set some 50 PSIA above the highest anticipated in-cell working pressure and sized to prevent bursting of cell-banks. Each cell-bank off-gas manifold preferably has a three-quarter inch valved outlet 106 close to each cathodic/anodic end plate for back-pressuring end plates as will be discussed in the next section. Each end of each cell-bank off-gas manifold is also preferably provided with a means of determining whether the respective manifold contains hydrogen or oxygen so that operators will know for certain which manifold contains fuel gas and which does not.

Cell bank cathodic/anodic end plates 80 are similar to electrodes 50 except that carbon steel for example on the order of one-inch thick are provided to reduce $I^2 R$ losses to a minimal level and equalize distribution of arriving or leaving DC current. End plates 80 are clad with very thin sheets of austenitic stainless steel to prevent corrosion. The end plates 80 extend above the cell-bank tank and have a top-mounted copper bar 82 for equalizing DC current across the top of plates. End plate extensions are also provided with bolt-holes for attaching DC bus bars to or from DC recitifers. Each end plate preferably has its outer surface lined with thin strips of electrode material 90 alternated around FEP Teflon stock 92 to create a series of one-inch square pressure pockets running from top to bottom of the end plate and dead ended at top and bottom of the end plates except for a topmounted stainless steel back-pressure manifold 96 within the order of 105 tees penetrating the FEP Teflon top plate. This assembly is adhered to itself and to end plates 80 during the hot melt procedure used to weld the rest of the cell-bank into a sealed pressure tank. The back pressure manifold has two valved tees aimed upward. These tees are connected to the cell-bank manifold valved tees, discussed previously by using removable sections of stainless steel pipe. When the cell banks are about to be put into operation the cell-bank oxygen manifold connection valves are locked open and the hydrogen manifold connection valves are closed and the connecting pipes are removed.

When a cell-bank is completely assembled and preferably hot melt sealed, it is leak checked and any leaks sealed by local heat welding procedures. Next the cell bank is sure tested at one-and-one half times its design maximum working pressure. A one-inch thick PVC sole 88 (FIG. 3) is laid out using small sheets pretreated with a weather resistant, pressure sensitive adhesive. Joints are left open and poured full of an adhesive that will adhere to PVC but not to floor. The cell-bank is then lowered onto its PVC sole which will act as a permanent dielectric barrier anl a semi-adjustable bed plate to allow placement of the cell-banks on pavement in lieu of special an expensive bases. Likewise sides and ends of cell-banks are faced with one-eighth inch thick sheets of PVC pretreated with a weather resistant, pressure sensitive adhesive. Joints are left open and filled with weather resistant adhesive. These sheets act as a permanent dielectric barrier and ultra violet light filter. Finally, the top of the cell-bank is mopped with an one-eighth inch thick epoxy cement or equal to serve the same purpose as the side and end sheeting. The dielectric skin of the cell-banks also protects exposed carbon steel core of the electrodes and end plates against rusting for decades and longer. Cell-bank corners are protected against physical damage by adding corner angles pretreated with pressure sensitive weather resistant adhesive.

Little or no instrumentation and control would be required to operate the present invention. Those that would be useful will already be available at DC rectifier control panel or at a control panel located within a mechanical equipment bay.

By using nine feet wide by ten feet high by up to 70 feet long or even longer cells, the cells allow units of significant hydrogen production capacity to be readily shipped by truck, rail, plane or container cargo ships. Since the cell-banks are modular they can be assembled to any practical length keeping in mind that heated rooms for successful use of the hot melt process must always be larger than the cell-banks units assembled. Since ratio of cell-bank weight to cell-bank volume is low, long units can be readily loaded and unloaded. The dimensions suggested herein are reasonable maxima in view of standard truck and flat car dimensions.

What is claimed is:

1. A bank of electrolytic cell for electrolytically converting water into its constituent gases of hydrogen and oxygen upon the application of a voltage source comprising:

two end plate electrodes, a plurality of intermediate electrodes spaced between said end plate electrodes, a plurality of dielectric separators individually spacing and electrically separating adjacent electrodes from one another and together with the said electrodes forming impervious electrolytic cell chambers between adjacent electrodes, pressure developing in said chamber during the converting of water into hydrogen and oxygen, a plurality of gas separator diaphragms individually spaced between adjacent electrodes to divide each said electrolytic cell chamber into two sections to prevent the remixing of hydrogen and oxygen, alkaline electrolyte contained in each cell chamber, means for connecting a voltage source to said electrodes, means for introducing water to each of said electrolytic cell chambers, first manifold means connected with like sections of each of said electrolytic cell chambers for allowing off-gas withdrawal of hydrogen, first automatic valve means for closing said first manifold whenever the pressure within said electrolytic cell chambers is equal to or less than a preselected pressure, second manifold means connected with the other like sections of each electrolytic cell chambers for allowing off-gas withdrawal of oxygen, second automatic valve means for closing said second manifold means whenever pressure within said electrolytic cell chambers is equal to or less than preselected pressure, means for back-pressuring the exterior walls of each end plate electrode to counter-balance any pressure developed within the adjacent electrolytic cell chambers and exerted against the inside wall of the end plate electrodes.

2. The modular bank of claim 1 wherein said intermediate electrodes are clad with a thin sheet of stainless steel to obviate electrode corrosion and provide a surface for the evolution and break away of gas bubbles and wherein said dialectric separators are formed of fluorinated ethylene-propylene.

3. The modular bank of claim 1 wherein said dialectric separators are adhered to said stainless steel electrode surfaces by a hot-melt process practiced at a temperature greater than 1000° R. and at a pressure greater than 25 psig.

4. The modular bank of claim 1 wherein said gas separator diaphragm is formed of two layers of finely woven glass fabric which permits the free migration of electrolyte through said diaphragm.

5. The modular bank of claim 1 wherein said electrolyte is 15% NAOH.

6. The modular bank of claim 1 wherein said electrolyte comprises 25% KOH.

7. The modular bank of claim 1 wherein said first manifold means includes a manifold filled with compressed glass wool to offer a surface area for plating out of liquids carried by off-gas.

8. The modular bank of claim 1 wherein said back-pressuring means comprises a material adhered to the exterior wall of each end plate to form pressure pockets and back-pressure manifold connected to said pressure pockets.

9. The modular bank of claim 8 wherein said back-pressure manifold is connected with said second manifold means.

10. The modular bank of claim 1 wherein said connecting means comprise extensions of said end plate electrodes for connection to DC power bus bars.

11. The modular bank of claim 1 wherein said bank includes means for permitting operation at temperatures up to 810° R. and pressures up to 1000 psig.

12. A bank of electrolytic cells for electrolytically converting water into its constituent gases of hydrogen and oxygen upon the application of a voltage source and for producing hydrogen at a pressure equal to or greater than the working pressure of a gas transmission line comprising:

two end plate electrodes, a plurality of intermediate, bipolar planar electrodes spaced between said end plate electrodes, said intermediate electrodes being clad with a thin sheet of stainless steel to obviate electrode corrosion and provide a surface for the evolution and break-away of gas bubbles, a plurality of dielectric separators spacing and electrically separating adjacent electrodes from one another and together with said electrodes forming impervious electrolytic cell chambers capable of withstanding pressures equal to or greater than the gas transmission pressure, a plurality of gas separator diaphragms individually spaced between adjacent electrodes to divide each said electrolytic cell chamber into two sections to prevent the remixing of hydrogen and oxygen, alkaline electrolyte contained in each cell chamber, means for connecting a voltage source to said electrodes, means for introducing water to each of said electrolytic cell chambers, first manifold means connected with like sections of each of said electrolytic cell chambers for allowing off-gas withdrawal of hydrogen, first automatic valve means for closing said first manifold means whenever pressure within said electrolytic cell chambers is equal to or less than the working pressure of the gas transmission line, second manifold means connected with the other like sections of each electrolytic cell chamber for allowing off-gas withdrawal of oxygen, second automatic valve means for closing said second manifold means whenever the pressure within said electrolytic cell chambers is equal to or less than the working pressure of the gas transmission line, and means for back-pressuring the exterior walls of each end plate electrode to counter-balance pressure developed within said electrolytic cell chambers and exerted against the inside wall of the end plate electrodes.

13. The modular bank of claim 12 wherein said dielectric separators are formed of fluorinated ethylenepropylene and are adhered to said stainless steel electrode surfaces by a hot-melt process practiced at a temperature greater than 1000° R. and at a pressure greater than 25 psig.

* * * * *